United States Patent Office
3,082,056
Patented Mar. 19, 1963

3,082,056
METHOD FOR FORMING TEXTILE FIBERS FROM PLASTICIZED ACRYLONITRILE POLYMERS
John R. Caldwell, Kingsport, Tenn., assignor to Eastman Kodak Company, Rochester, N.Y., a corporation of New Jersey
No Drawing. Filed Apr. 12, 1961, Ser. No. 102,401
3 Claims. (Cl. 18—54)

This invention relates to the production of shaped articles from acrylonitrile polymers. The invention is particularly concerned with the preparation of novel plasticized acrylonitrile polymer compositions which contain new plasticizers or softening agents.

An object of the present invention is to provide new plasticizers or softening agents for acrylonitrile polymers. Another object of this invention is to provide plasticized acrylonitrile polymer compositions that can be extruded or pressed into sheets, rods, tubes and other shaped objects. Another object of this invention is to provide a means for producing acrylonitrile polymer fibers by a melt-spinning process. Still another object of this invention is to provide novel plasticizers which are water insoluble.

In accordance with the present invention, these and other objects depend on my discovery of a new solvent and/or plasticizer class for polyacrylonitriles and are generally attained by dissolving or mixing the polyacrylonitrile, its copolymers, interpolymers and graft polymers, in which a substantial portion of the polymer is polyacrylonitrile, in certain classes of compounds that contain two or more cyano groups as described hereinafter. The new plasticizers have the property of softening and/or dissolving such acrylonitrile polymers, as herein mentioned, at elevated temperatures so that the compositions can be molded, extruded, melt spun or otherwise formed into desired shapes by various processes.

Solvents and plasticizers for various acrylonitrile polymers are, of course, known in the prior art.

A class of plasticizers for polyacrylonitrile is described in my U.S. Patent No. 2,656,328. However, those plasticizers are cyclic urethanes and hence, have no relationship to the cyano compounds employed in the present invention.

A discussion of polyacrylonitrile solvents is given by R. C. Houtz in Tex. Res. Journal, 20, 786–801. A patent review is given in this article. It is there stated that a critical ratio exists between the number of cyano groups and the number of other carbon atoms present in the compound. If this critical ratio is exceeded, the compound is not a solvent for polymers rich in acrylonitrile. For example, at page 789 of the article, it is shown that adiponitrile is a solvent for polyacrylonitrile, but suberonitrile is not a solvent. Adiponitrile contains 2 cyano groups and four other carbon atoms, thus having a ratio of 2 other carbon atoms for each cyano group. Suberonitrile, which is a non-solvent, has a ratio of three other carbon atoms for each cyano group. Thus, it is taught that compounds having a ratio of more than two carbon atoms per cyano group are non-solvents.

I have made the surprising and unpredictable discovery that certain cyano compounds are solvents and/or plasticizers for acrylonitrile polymers even though they contain a ratio of four carbon atoms per cyano group. It is apparent that this discovery is contradictory to the teachings of the prior art. Furthermore, the plasticizers of the present invention possess an important advantage over those disclosed by Houtz because they are relatively insoluble in water. The compounds disclosed in the Houtz article are soluble in water and hence, have no value as permanent plasticizers in commercial plastics, films, etc.

In illustrating the present invention, 4-methyl-4-acetyl-pimelonitrile may be taken as an example. This compound has two cyano groups and eight other carbon atoms, thus containing a ratio of four carbon atoms per cyano group. Another illustrative compound is 4-cyano-4-phenyl-pimelonitrile which has a ratio of 3.7 carbon atoms per cyano group. This compound is relatively insoluble in water.

Polycyano compounds that are useful in the process of the invention include those having the general structure:

$$\text{NC—CH}_2\text{—CH}_2\text{—}\underset{\underset{R}{|}}{\overset{\overset{R'}{|}}{C}}\text{—CH}_2\text{—CH}_2\text{—CN}$$

wherein R may be a member selected from —CN, —OCCH$_3$, —OCCH$_2$CH$_3$,

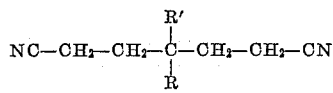

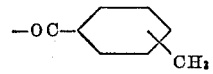

—CO—OC$_2$H$_5$

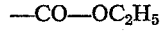

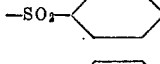

—SO$_2$—C$_2$H$_5$, —CO—N(CH$_3$)$_2$, and wherein R' may be a member selected from —CH$_3$, —C$_2$H$_5$,

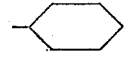

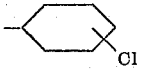

—CO—OC$_2$H$_5$, —OCCH$_3$,

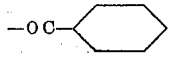

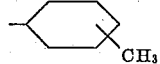

Other suitable compounds include those that contain more than two cyano groups as represented by the tri cyanoethyl or tetracyanoethyl derivatives of acetone methyl ethyl ketone cyclohexanone, acetophenone, etc.

The amount of polycyano compound employed wil depend upon the type of product desired. In cases wher it is desired to have a relatively fluid dope or solution, i may be desirable to use as much as 300 to 1500 parts o polycyano compound for 100 parts of the selected acrylo nitrile polymer. In the preferred embodiment of the in vention, the polycyano compound is used as a plasticize or extrusion aid and for this purpose, from 10 to 50 part is used for 100 parts of acrylonitrile.

The plasticizer can be incorporated in the acrylonitril polymer by various means such as hot rolls, sigma-blad mixers, etc. A particularly useful method is the slurr process in which the finely-divided polymer is agitate with a solution of the plasticizer in a volatile solvent an the solvent is evaporated.

Polyacrylonitrile and a wide variety of acrylonitril interpolymers and graft polymers may be used in th process of the invention. My invention has its greates utility when applied to polymers that contain more tha about 80% acrylonitrile because such compositions hav a high-melting point and desirable physical propertie Polymers containing less than about 80% acrylonitrile also may be processed advantageously. Examples of such interpolymers that have unusually high-melting points are found in my U.S. Patents Nos. 2,706,720 and 2,706,721. Suitable comonomers that may be interpolymerized with acrylonitrile are listed in U.S. Patent No. 2,805,215 in columns 2 and 3 thereof.

The polycyano compounds employed as plasticizers and/or solvents may be made by introducing two or more cyanoethyl groups into active methylene compounds such as ketones, β-ketoesters, cyanoacetic acid derivatives, malonic acid derivatives, sulfones, etc. A detailed description of the cyanoethylation reaction and its products is given by Bruson in pages 79–135 of Organic Reactions, volume V, 1949, Wiley. The polycyano compounds may also be made by other types of known synthesis.

This invention is further illustrated in the following examples:

Example 1

An emulsion polymer was made having the composition 88% acrylonitrile–12% isopropenyl acetate. It was isolated as a fine powder. One hundred parts of the powder was slurried with 30 parts of 4-cyano-4-phenyl-pimelonitrile in 300 parts of acetone and the acetone was evaporated. The composition was molded at a temperature of 190–195° C. to give clear, hard buttons. When the unplasticized polymer was molded under the same conditions, the button was opaque and crumbly. When an attempt was made to mold the unplasticized polymer at higher temperatures, it decomposed and gave off gaseous products.

The plasticized composition was extruded at 190–195° C. to give a clear, strong monofilament which could be drafted at elevated temperatures.

Fibers were spun by extruding the plasticized composition through a multi-hole spinnerette. The fibers were drafted 300–400% at an elevated temperature and then passed through a bath of isopropyl alcohol at 70–80° C. to extract the plasticizer. The fibers had a tensile strength of 3.2 grams per denier, an elongation of 20% and a hot bar sticking temperature of 230–240° C.

Example 2

One part of the polymer used in Example 1 was heated with 10 parts of 4-methyl-4-acetyl-pimelonitrile at 130–140° C. with stirring. A clear solution was formed, which remained clear when cooled to room temperature. The solution was extruded into a bath of isopropyl alcohol to give fibers.

Example 3

An emulsion copolymer was prepared having the composition 94% acrylonitrile–6% N-isopropylacrylamide. It was isolated as a fine powder and mixed with 4-methyl-4-acetyl-pimelonitrile by the slurry method. A ratio of 100 parts polymer and 30 parts plasticizer was used. The composition was extruded at 195–200° C. to give a clear, strong rod. A sheet was made by extruding the composition through a suitable die. Filaments were made by extruding the composition through a spinnerette. After the filaments were drafted, they were wound into skeins and the skeins were extracted with boiling acetone to remove the plasticizer.

Example 4

A copolymer was prepared having the composition 80% acrylonitrile–20% lauryl methacrylate. One hundred parts of the polymer and 50 parts of ethyl α,α-di(2-cyanoethyl)acetoacetate were mixed on heated rolls until a clear, pliable sheet was obtained. The product was readily molded and extruded by standard methods.

Example 5

An interpolymer was prepared having the composition 75% acrylonitrile–25% dibutyl ester of bicycloheptene-2,3-dicarboxylic acid, as described in my U.S. Patent No. 2,706,721. One hundred parts of the polymer was blended with 25 parts of diethyl α,α-di(2-cyanoethyl)-malonate by the slurry method. The composition was extruded at 190–200° C. to give clear, strong rods, sheets and tubes.

Example 6

Polyacrylonitrile having an inherent viscosity of 0.5 was made by known methods. One hundred parts of the finely-divided polymer was mixed with 50 parts of 4-methyl-4-acetyl-pimelonitrile by the slurry method. The composition was extruded to give sheets, rods and tubes.

Example 7

An emulsion polymer was made having the composition 80% acrylonitrile–20% methacrylonitrile. It was isolated as a fine powder. One hundred parts of the polymer was mixed with 35 parts of 4-methyl-4-benzoyl-pimelonitrile by the slurry process. The composition was suitable for extrusion into sheets, rods, tubes, etc.

Example 8

An emulsion polymer was made having the composition 90% acrylonitrile–10% methyl acrylate. One hundred parts of the finely-powdered polymer was mixed with 30 parts of 4-benzoyl-4-(2-cyanoethyl)pimelonitrile by the slurry method. The composition was suitable for extrusion at 190–220° C. into sheets, rods, tubes and fibers.

Example 9

An emulsion polymer was made having the composition 80% acrylonitrile–20% N-bicycloheptylacrylamide. One hundred parts of the polymer was mixed with 35 parts of 2,2,6,6-tetra(2-cyanoethyl)cyclohexanone. The composition was useful for molding and extrusion.

I claim:

1. A method for forming textile fibers which comprises extruding at 190–195° C. a fiber-forming composition comprising a polymer of 88% acrylonitrile and 12% isopropenyl acetate plasticized with 4-cyano-4-phenol-pimelonitrile through a multi-hole spinnerette, drafting the fibers 300–400% at an elevated temperature and extracting the plasticizer from the fibers by passing them through a bath of isopropyl alcohol to give fibers having a tensile strength of 3.2 grams per denier, an elongation of 20% and a hot-bar sticking temperature of 230–240° C.

2. A method for forming textile fibers which comprises extruding a polymer of 88% acrylonitrile and 12% isopropenyl acetate plasticized with 4-methyl-4-acetyl pimelonitrile through a multi-hole spinnerette into a bath of isopropyl alcohol.

3. A method for forming textile fibers which comprises extruding at a temperature of 195–200° C. a polymer of 94% acrylonitrile and 6% N-isopropyl acrylamide plasticized with 4-methyl-4-acetyl-pimelonitrile, drafting the filaments and extracting the plasticizer by passing the filaments through boiling acetone.

References Cited in the file of this patent

UNITED STATES PATENTS

| | | |
|---|---|---|
| 2,588,335 | Dalton | Mar. 11, 1952 |
| 2,723,900 | Hooper | Nov. 15, 1955 |
| 2,948,581 | Cummings | Aug. 9, 1960 |
| 2,990,392 | Saxon et al. | June 27, 1961 |